United States Patent
Schouler (10) Patent No.: US 10,798,565 B2
(45) Date of Patent: Oct. 6, 2020

(54) ALLOCATION OF PROFILES TO A PLURALITY OF INSTALLED SIM CARD TERMINALS

(71) Applicant: Orange, Paris (FR)

(72) Inventor: Eric Schouler, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/335,429

(22) PCT Filed: Sep. 26, 2017

(86) PCT No.: PCT/FR2017/052578
§ 371 (c)(1),
(2) Date: Mar. 21, 2019

(87) PCT Pub. No.: WO2018/060582
PCT Pub. Date: Apr. 5, 2018

(65) Prior Publication Data
US 2020/0021975 A1    Jan. 16, 2020

(30) Foreign Application Priority Data

Sep. 29, 2016  (FR) ..................................... 16 59316

(51) Int. Cl.
*H04W 12/04*    (2009.01)
*H04W 8/26*    (2009.01)
(Continued)

(52) U.S. Cl.
CPC .......... *H04W 8/265* (2013.01); *H04W 8/205* (2013.01); *H04W 12/0023* (2019.01); *H04W 12/00512* (2019.01); *H04W 12/08* (2013.01)

(58) Field of Classification Search
CPC ............ H04W 8/265; H04W 12/0023; H04W 12/00512; H04W 8/05; H04W 12/08;
(Continued)

(56) References Cited

U.S. PATENT DOCUMENTS

| | | | |
|---|---|---|---|
| 2009/0217348 A1* | 8/2009 | Salmela | H04W 4/70 726/2 |
| 2012/0117635 A1* | 5/2012 | Schell | H04W 12/06 726/9 |

(Continued)

FOREIGN PATENT DOCUMENTS

| | | | | |
|---|---|---|---|---|
| EP | 2461613 A1 | 6/2012 | | |
| WO | WO-2017061800 A1 * | 4/2017 | | H04W 8/20 |

OTHER PUBLICATIONS

International Search Report dated Dec. 1, 2017 for corresponding International Application No. PCT/FR2017/052580, filed Sep. 26, 2017.
(Continued)

*Primary Examiner* — Nathan S Taylor
(74) *Attorney, Agent, or Firm* — David D. Brush; Westman, Champlin & Koehler, P.A.

(57) ABSTRACT

A method implemented by a control server for configuring a security module connected to a telecommunication terminal. In particular, the control server allocates a unique activation code corresponding to a subscription including a plurality of N profiles to allocate to a fleet of N respective terminals. Thus the control server: a) after activation of the code with a first terminal, allocates a profile to the first terminal and records the profile allocation to the first terminal, and b) for a new profile allocation request corresponding to the activation code, repeats step a) if the N profiles have not already been allocated.

14 Claims, 4 Drawing Sheets

(51) Int. Cl.
*H04W 12/00* (2009.01)
*H04W 8/20* (2009.01)
*H04W 12/08* (2009.01)

(58) Field of Classification Search
CPC . H04W 12/0027; H04W 8/205; H04W 12/04; H04W 12/06; H04W 4/00; H04W 8/20; G06F 9/4451; G06F 9/445; G06F 21/45
USPC ......................................................... 455/425
See application file for complete search history.

(56) References Cited

U.S. PATENT DOCUMENTS

| | | | | |
|---|---|---|---|---|
| 2012/0331292 | A1* | 12/2012 | Haggerty | H04L 63/0272 713/168 |
| 2013/0067026 | A1* | 3/2013 | Hershko | H04L 61/106 709/217 |
| 2013/0165073 | A1* | 6/2013 | Madsen | H04W 12/06 455/411 |
| 2013/0227646 | A1* | 8/2013 | Haggerty | H04L 63/0853 726/3 |
| 2014/0024343 | A1* | 1/2014 | Bradley | H04W 4/70 455/411 |
| 2014/0162622 | A1* | 6/2014 | Oda | H04W 4/08 455/419 |
| 2015/0382178 | A1* | 12/2015 | Park | H04L 63/0853 455/411 |
| 2016/0044493 | A1* | 2/2016 | Schell | H04W 8/205 455/411 |
| 2016/0044495 | A1* | 2/2016 | Schell | H04W 8/205 455/419 |
| 2016/0241537 | A1* | 8/2016 | Cha | H04W 12/04 |
| 2016/0283216 | A1* | 9/2016 | Gao | H04L 63/0428 |
| 2016/0353274 | A1* | 12/2016 | Chichierchia | H04B 1/3816 |
| 2016/0379006 | A1* | 12/2016 | Merrien | H04W 4/70 726/4 |
| 2017/0180349 | A1* | 6/2017 | Park | H04W 12/06 |
| 2018/0302781 | A1* | 10/2018 | Lee | H04W 8/20 |
| 2019/0208405 | A1* | 7/2019 | Park | H04L 63/0876 |
| 2019/0313241 | A1* | 10/2019 | Ahmed | H04W 12/06 |
| 2019/0324735 | A1* | 10/2019 | Park | H04L 63/102 |

OTHER PUBLICATIONS

Written Opinion of the International Searching Authority dated Dec. 1, 2017 for corresponding International Application No. PCT/FR2017/052580, filed Sep. 26, 2017.
GSM Association SGP.22—RSP Technical Specification, Version 1.1, Jun. 9, 2016.
International Search Report dated Oct. 27, 2017 for corresponding International Application No. PCT/FR2017/052578, filed Sep. 26, 2017.
Written Opinion of the International Searching Authority dated Oct. 27, 2017 for corresponding International Application No. PCT/FR2017/052578, filed Sep. 26, 2017.
English translation of the Written Opinion of the International Searching Authority, dated Nov. 14, 2017 for corresponding International Application No. PCT/FR2017/052578 filed Sep. 26, 2017.
English translation of the Written Opinion of the International Searching Authority, dated Dec. 12, 2017 for corresponding International Application No. PCT/FR2017/052580, filed Sep. 26, 2017.
"SGP.22—RSP Technical Specification" v.1.1 dated Jun. 9, 2016.
"RSP Architecture" technical specification, version 1.0, dated Dec. 23, 2015.

* cited by examiner

ALLOCATION OF PROFILES TO A PLURALITY OF INSTALLED SIM CARD TERMINALS

CROSS-REFERENCE TO RELATED APPLICATIONS

This application is a Section 371 National Stage Application of International Application No. PCT/FR2017/052578, filed Sep. 26, 2017, the content of which is incorporated herein by reference in its entirety, and published as WO 2018/060582 on Apr. 5, 2018, not in English.

FIELD OF THE DISCLOSURE

The invention relates to the management of the issuance of an activation code for a security module of a communicating device (or "SIM card").

BACKGROUND OF THE DISCLOSURE

The design of communicating devices, and especially mobile terminals of the smartphone type in particular, is moving towards solutions for embedding the SIM card ("Subscriber Identity Module") in the terminal (or "embedded SIM", hereinafter referred to as e-SIM). These cards are "soldered" to the terminal and provided without software by the manufacturer of the mobile device. The terminal can then only be affiliated with an operator by downloading a "profile" (for example, a membership offering access to a greater or lesser number of resources and/or for a greater or lesser duration). The operator therefore has a functional element that determines the profile associated with the particular e-SIM card installed in the terminal, which can then be recognized by the network in order to operate according to this determined profile.

The SIM card (or its e-SIM equivalent integrated directly into the terminal) has a memory which is programmable in particular with profile information allocated to the card (or directly to the terminal).

In a currently known situation, an operator or manager of a terminal fleet can acquire a set of profile offers, and must then activate, one by one, each profile at each terminal.

More specifically, the GSM Association (or "GSMA") specifies an architecture required to implement the e-SIM program. The architecture, standardized, is built according to the classical principles of the operator where the latter carries out (in a global way) the following steps:

An operator orders a batch of N profiles in advance of a certain type (identified by the "profile description ID" parameter), A client subscribes to an offer from the operator and the operator determines the appropriate profile type for the given offer and reserves a profile of the appropriate type (a variant that may consist in generating the required profile at this step rather than having built a complete batch in advance), In order to provide this profile to the client, the operator specifies an Activation Code (AC) to the client (or the operator asks the SMDP+ server to communicate this activation code to a device of SM-DS ("Discovery Server") type automatically giving the activation code to the terminal after switching the terminal on or by explicit action from a menu in the terminal), The client can then use this code to start downloading the profile, which is then installed in the e-SIM card of his or her terminal (noting that in the case of the SM-DS device, the terminal retrieves the activation code data from the SM-DS device and proceeds in a similar way to the profile download).

It appears in the above sequence of steps that the basic principle proposed by GSMA is to make the issuance of the activation code conditional on the prior existence of a profile to be downloaded. In addition, GSMA currently considers one activation per profile, and therefore a single activation code per profile.

In practice, the identifier for the SIM card (called "EID" for an integrated SIM card), as well as in the data extracted from the activation code, is received by a server responsible for preparing subscription management data (called the SMDP server in the current GSMA standard, or SMDP+ below), which evaluates the activation code and determines whether a profile, usually referred to as ICCID, is already provided or possibly already recorded for this SIM card, before issuing the profile.

Thus, an operator or manager of a terminal fleet must manage one by one the terminal association and the activation code, i.e. ultimately the profile planned for each terminal . . . . Such embodiment offers little management flexibility because it imposes predetermined profiles for a fleet of terminals, even though the needs of the profiles may not necessarily already be specified. For example, an administrator for the terminal fleet of a company may wish to initially order:

three "gold" profiles (purely as an illustrative example) for company authorities,
twenty "silver" profiles for executives, and
one hundred "standard" profiles for other employees.

The director therefore orders 123 terminals and, in the event that one of the employees leaves the company to be replaced by an executive, it is impossible for him of her to dynamically change the profile of the terminal that was intended for the employee, in such a way that the new manager must use the "standard" profile terminal or wait after ordering a "silver" profile terminal.

The same problem arises for an operator providing a network connection for a fleet of N terminals. The operator must anticipate the request for N1 "gold" profiles, N2 "silver" profiles and N3 "standard" profiles. It is impossible for this operator to define or redefine the profile once it has received the SIM card activation code. It should be noted that the problem is particularly acute in the case of an e-SIM card because in this case, the terminal itself can only be used for a previously determined profile.

SUMMARY

This invention will improve the situation.

To this end, it proposes a method, implemented by a control server, for configuring a security module associated with a telecommunication terminal. In particular, the control server allocates a unique activation code corresponding to a subscription comprising a plurality of N profiles to be allocated to a set of N respective terminals. The method then includes the steps:

a) after the activation of the code at a first terminal, allocating a profile to the first terminal and recording the profile allocation to the first terminal, b) for a new profile allocation request corresponding to said activation code, repeating step a) if the N profiles have not already been allocated.

Thus, in the approach of this invention, the first step of the method aims to activate the security module (e.g. an e-SIM card) in the first instance, and not to first define the associated profile, the activation time of the profile can then be postponed according to the choice of a manager for the terminal or for the set of terminals (e.g. a terminal fleet manager). Additional verifications may follow after the activation (such as a requested type of offer, contributing to the profile definition). This "inversion" of steps provides flexibility in the profile selection, which is reported after the verifications on the e-SIM card. These verifications consist in particular in verifying a compatibility between a terminal, an e-SIM card identifier and a profile. In the previous art, since the manager may have previously acquired a fleet of offers for example, the profiles are immediately allocated, which is not suitable for proposing a dynamic approach in the allocation of e-SIM card profiles. The method thus makes it possible to associate an activation code with a plurality of profiles, with the receipt of the activation code triggering actions to issue the subscribed services. "Issuance actions" refers to the configuration of the operator network of the equipment making it possible to offer the subscribed services. The method thus makes it possible to introduce operator control of the profile upload process.

Thus, in an embodiment, the control server associates N profiles to be allocated when allocating the activation code.

The N profiles to be allocated are already defined when the activation code is allocated and are associated with the activation code.

Alternatively, the control server associates a profile with the terminal when requesting an allocation. In this variant, the profile is defined when the code is activated. This makes it possible to make the profile allocation to the terminal more flexible. The issuance actions are thus performed when the profile is effectively allocated. This makes it possible to limit the consumption of resources in the operator network.

Figure 2A:
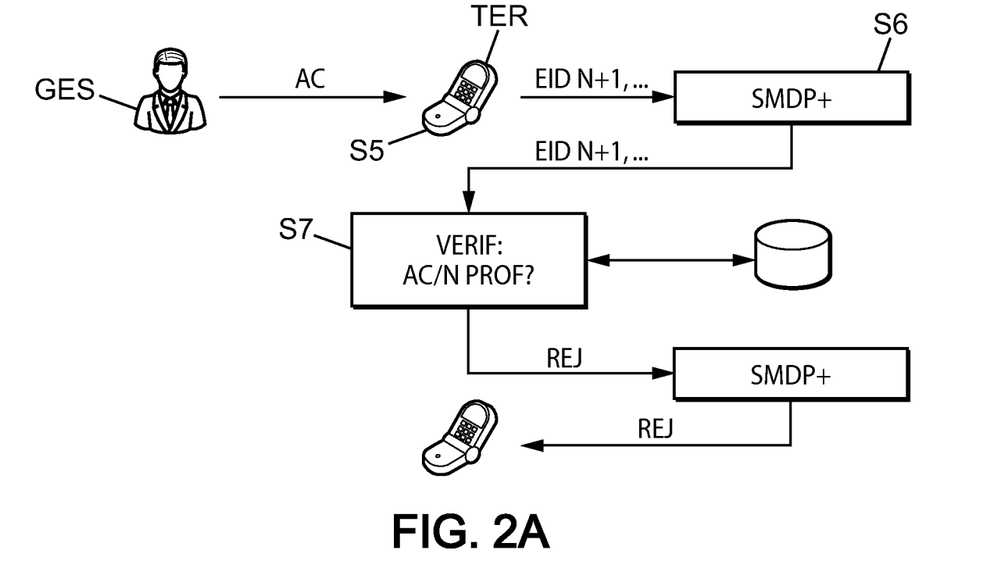
FIG. 2A illustrates a first case of rejection of a profile request if N profiles have already been allocated to the N terminals of the fleet.

In an embodiment described in detail later with reference to FIG. 2A, any new profile request corresponding to said activation code is rejected if the N profiles have already been allocated.

Figure 2B:
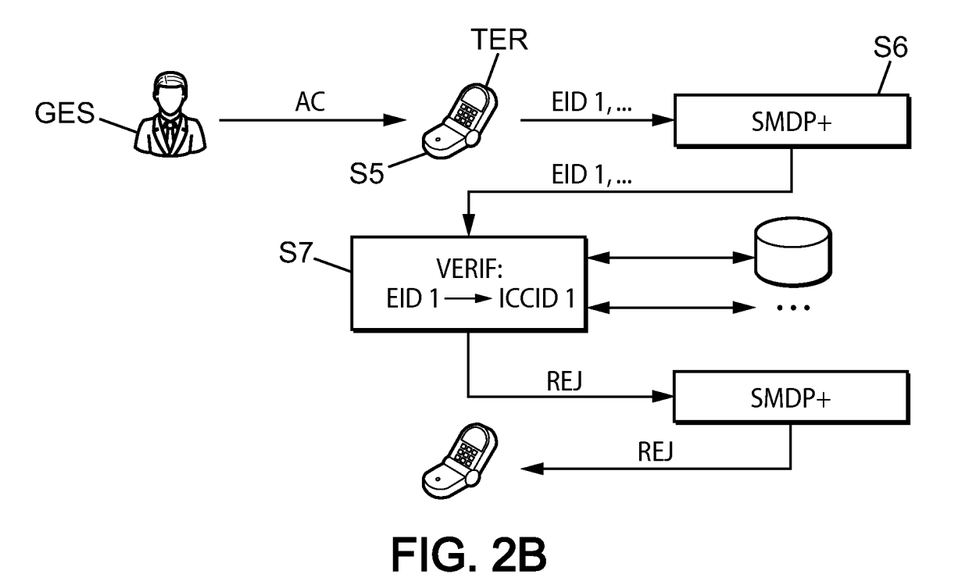
FIG. 2B illustrates a second case where a profile request is rejected if a profile has already been allocated to this terminal.

In an embodiment described in detail later with reference to FIG. 2B:
 after activating the code on a terminal from the set of terminals, the control server receives from this terminal at least one security module identifier embedded in the terminal (typically the EID identifier), and
 verifies in the memory whether a profile has already been allocated for a terminal with this security module identifier.

In an embodiment, it may be decided that if a profile has already been allocated for a terminal with this security module identifier, then the control server rejects a profile allocation request sent by a terminal with this security module identifier.

However, in an embodiment variant, it is possible to ask the manager of the set of terminals to redefine a profile, which allows dynamic and evolving profile management, as presented in the detailed description below.

In addition, in an embodiment, if no profile has already been allocated for a terminal having this security module identifier, the control server can communicate with a computer entity having a man/machine interface available to a manager of the set of terminals, in order to receive from the manager a choice of profile to be allocated to this terminal.

In an embodiment, after activating the code on a terminal from the terminal set, the control server receives from this terminal at least one data corresponding to the activation code (e. g. MatchingID data showing in particular the validity of the activation code) and allowing the control server to find in the memory the profile allocations (usually ICCID-type identifiers) that were already made for terminals from said terminal set.

In an embodiment, terminal data received by the control server, before a profile is allocated to this terminal, transit via an access server. This access server can typically be a DMPS or DMPS+ server, or equivalent.

Data for installing a profile at a terminal can then be sent by the control server and transmitted to the terminal, also, via such access server.

This invention also includes a computer program with instructions for the implementation of the above method, when this program is executed by a processor.

This invention also covers a control server, comprising at least one processing circuit for running the steps of the above method, in order to configure each security module installed in each telecommunication terminal from a set of N terminals.

Such server can then also include a communication interface with an access server.

It may also include a communication interface with a computer entity including a man/machine interface available to a manager of the set of terminals, in order to receive from the manager a choice of profile to be allocated to each terminal from the above set.

BRIEF DESCRIPTION OF THE DRAWINGS

Other advantages and characteristics of the invention will appear when reading the detailed description of embodiment examples below and when examining the attached drawings on which.

DETAILED DESCRIPTION OF ILLUSTRATIVE EMBODIMENTS

This invention preferentially offers to introduce a notion of group of profiles for which the same and only activation is requested. Compared to the current GSMA standardization, a unique relationship of one-to-one becomes one to N. A typical application of this need is the case of a multi-SIM order where the client then has the same activation code that can be used for all his profiles. An access profile is a set of data and applications allowing a mobile device, once the profile is activated, to access the network of an operator.

The rest of the description provides examples of several embodiments applying to a security module of eUICC card type as being standardized within the GSMA association framework, but the configuration procedure also applies to other types of security modules. More generally, the security module is a dedicated tamper-proof platform, including hardware and software, capable of securely hosting applications and their confidential and cryptographic data and providing a secure application execution environment, such as an UICC-type card.

The security module is typically a "eUICC"-type card (embedded Universal Integrated Circuit Card), also called "eSIM" (embedded Subscriber Identity Module), or an irremovable SIM card. There are no limitations associated with this type of card. In a particular embodiment, the security module is a chip card with an operating system offering the functionalities of an eUICC-type card. In another particular embodiment, the security module is integrated into the terminal, thus forming a single entity.

The following description is in the context of the technical specifications, such as defined by the GSMA association. More specifically, the remote configuration management architecture is defined in the "RSP Architecture" technical specification, version 1.0, dated 23 Dec. 2015 and the procedures are defined in the "SGP.22—RSP Technical Specification" v.1.1 dated 9 Jun. 2016.

The introduction of the profile group makes it possible to consider not one group with the same profile but several groups whose profiles could be different, always using the same activation. The activation in the usual GSMA sense is therefore not compatible with this approach since the proposed activation is new and different in nature from the state of the art. This new activation requires interaction between the information system of the operator (or more generally between a control server) and the SMDP+ server ("Subscription Manager Data Preparation+") in order to transmit to the latter the appropriate orders for installing the profile in the terminal. This server is called an access server thereafter.

Figure 1:
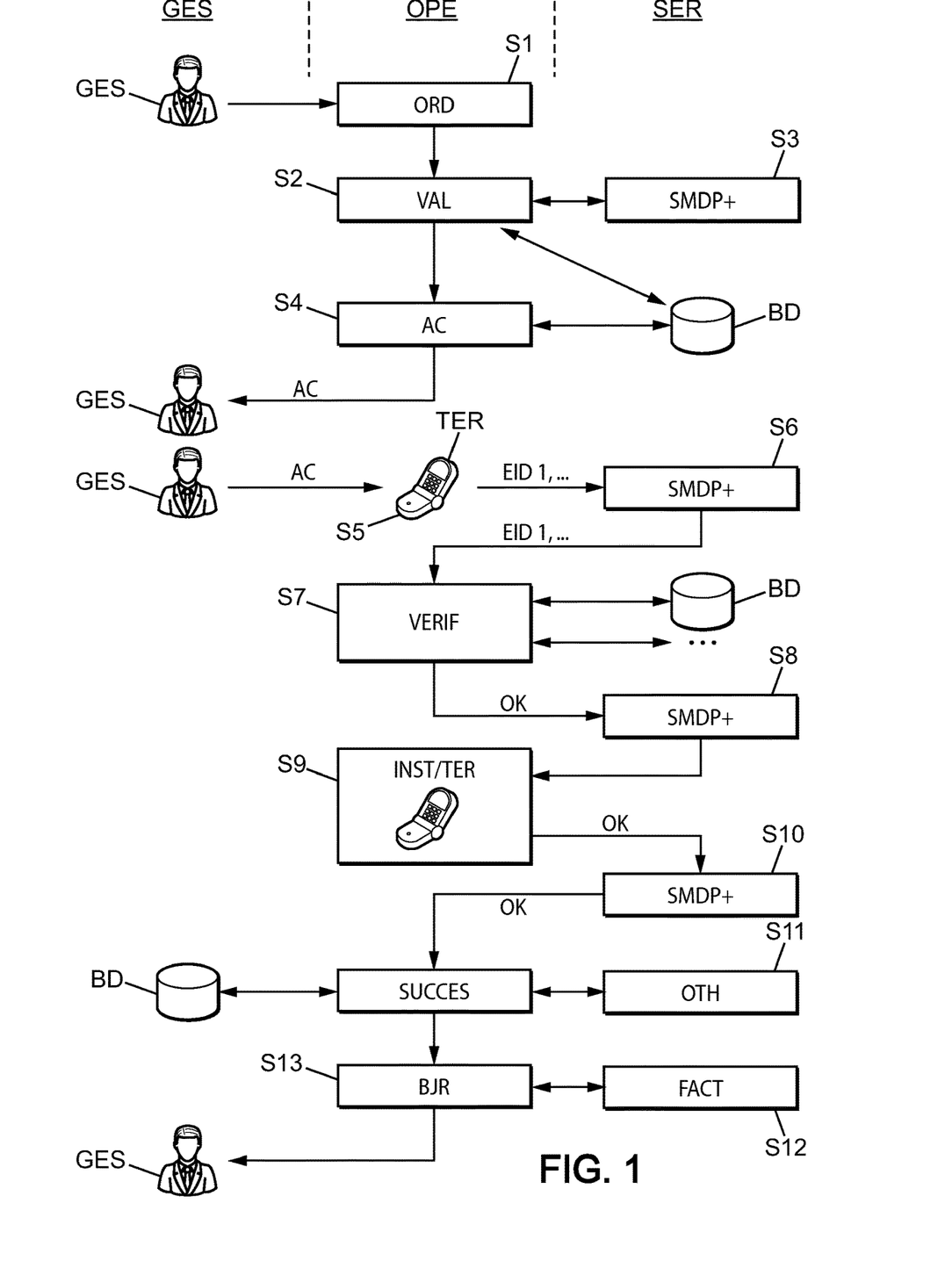
FIG. 1 shows the interactions between a client or fleet manager GES, a control server OPE and an access server SER, for activating a terminal and then allocating a profile.

With reference to FIG. 1, a client or fleet manager GES confirms an order, for example of multi-SIM type, and in return obtains a common activation code AC for a set of terminals, from a single multi-SIM order. As defined in paragraph 4.1 of the SG.22 technical specification, an activation code AC corresponds to a string of characters and includes various information elements separated by a "$" character. The activation code AC includes, in particular, an SMDP+ server address to contact in order to obtain the access profile, data relating to the activation code and an identifier of the SMDP+ server. Of course, this list is not exhaustive. The order is entered at a control server OPE, for example integrated into the information system of the operator in step S1, and for example validated in step S2, and then transmitted to the SMDP+ server (referred to as SER in FIG. 1) in step S3 for an activation of N profiles. The access server SER provides an activation code AC corresponding to this activation of N profiles. Still in this step S2, the control server OPE:

records a multi-SIM offer for this client or fleet manager GES in its database BD,
  receives and records the activation code AC in its database, this activation code being intended for use of the client or the manager GES,
  and can, for example, define N profiles to be allocated, and record N corresponding profile ICCID identifiers.

In step S4, the manager GES receives the activation code AC from the grouped order, and can then (he or she or the person to whom he or she has given this code), in step S5, enter this code in the terminal TER in order to activate the SIM card of this terminal TER. Entering the activation code data into the terminal allows the terminal to:

identify the SMDP+ server to which it must then connect in order to receive its profile, and transmit to the SMDP+ server data relating to the activation code, usually called "MatchingID". This data is included in the activation code AC and allows the SMDP+ server to determine the operator to which the profile request is addressed. Thus, the SMDP+ server, upon receipt of the MatchingID data, is able to transmit the data received from the terminal TER to the control server OPE of the appropriate operator. The data received from the terminal includes the MatchingID data, as well as the e-SIM EID1 identifier of the terminal TER. Thus, the SMDP+ server can transmit the MatchingID data and the EID1 identifier to the server OPE. The control server OPE can, with the MatchingID data, identify the multi-SIM order corresponding to the activation code AC allocated to the terminal fleet and determine that the EID1 identifier received corresponds to that of a terminal in that fleet.

Thus, the control server OPE can find the data of the multi-SIM order corresponding to this activation code AC, and initiate the procedure of allocating a profile (ICCID1 identifier) for this terminal (e-SIM EID1 identifier). The server OPE can then decrement the number N of profiles to be allocated to the fleet of terminals that were the subject of the multi-SIM order. In a variant, the server OPE was able to record all e-SIM identifiers (EID1, EID2, etc.) before step S3 in accordance with the activation code AC and can then determine that the received EID1 identifier is specific to the multi-SIM order to which a unique activation code AC is allocated. Again, the server OPE can initiate the procedure of allocating an ICCID1 profile to the EID1 terminal, and decrease the number N of profiles still to be allocated.

Thus, in either of these embodiments, upon receipt of the EID1 identifier, the control server OPE, in step S7, finds the multi-SIM order and the profiles that had been associated with this order, then updates the ICCID1 profile identifier specific to this e-SIM EID1 identifier in its database, and decrements the number of profiles still to be defined (N becomes N−1). At this step S7 or a later step, for example, interactions can take place between the information system of the operator and the fleet manager in order to verify and precisely define the profile to be allocated to the terminal TER (profile according to the "gold" or "silver" offer, etc.). This data can then be stored at the control server OPE.

This step of exchanges between the operator and the manager GES and the recording of the corresponding profile data at the control server OPE allows the definitive allocation of a profile.

At the end of step S7, the operator validates the profile and sends the SMDP+ server an authorization to upload the verified profile (depending on the "gold" or "silver" offer, etc.) with ICCID1 identifier to the e-SIM EID1 identifier terminal. Upon receipt of this authorization, the SMDP+ server sends data to the terminal TER in step S8 in order to install this profile in the terminal TER. Once the installation is completed, in step S9, the control server OPE receives information about the success of the installation and the method can continue in a way known per se with:

in step S10, communication from the SMDP+ server to the control server OPE of the operator that the ICCID1 profile is installed at the EID1 terminal (in this step the control server can update the data specific to the EID1 terminal, by confirming the association of an allocated ICCID1 profile identifier),
  in step S11, additional actions of the server OPE can be carried out in particular with other devices (belonging to the operator) that require, for example, to know the profile name (ICCID) and the EID identifier with which the profile was successfully installed. Such devices are then able to contact the terminal and this particular profile in order to operate other steps which are not described here;

in step S13, the possibility for the operator to directly contact the terminal TER in order to confirm the activation of the terminal (the manager GES then receives the activation message in the terminal) and to validate the subscribed services and to start the charging in step S12 for this terminal.

In an embodiment variant, in step S2, the control server OPE:

records a multi-SIM offer for this client or fleet manager GES in its database BD, receives and records the activation code AC in its database, this activation code being intended for use of the client or the manager GES.

In this variant, the N profiles to be allocated are not yet defined.

In this case, in step S7, when activating the activation code AC, upon receipt of the EID1 identifier, the control server OPE finds the multi-SIM order, associates a profile with this terminal by exchanging with the SMDP+ server, then updates the ICCID1 profile identifier specific to this e-SIM EID1 identifier in its database BD, and decrements the number of profiles still to be defined (N becoming N−1).

If necessary in order to define the profile to be allocated, the control server OPE communicates with a computer entity having a man/machine interface available to a manager of the terminal set, in order to receive from the manager a choice of profile to be allocated to this terminal.

This group activation using the unique code AC in the sense of the invention offers great flexibility because it does not require knowledge of the groups in advance. Therefore, this new activation can be built without reference to profile groups. This is then an activation without a profile determined in advance.

In step S7 of verifying the EID identifier received from a terminal, the server OPE can verify that the overall number of profiles already allocated for the fleet to which this terminal belongs and for which the common activation code AC has been provided, has not been reached. If at least this first condition is not verified, the profile allocation request is rejected. This situation is illustrated in FIG. 2A: in step S7, it is verified that the number N of profiles to be allocated for the fleet associated with the activation code AC has already been reached, in which case the terminal profile request is rejected and this rejection is transmitted from the SMDP+ server to the terminal TER.

In step S7, the server SER can also verify that no profile other than the one to which the code AC corresponds has already been allocated to this EID identifier terminal. If this is the case, the server SER can reject the profile allocation request, as shown in FIG. 2B. However, in a variant, it would be possible to allow the redefinition of a profile which is already allocated to a terminal and accept a migration leading to a new profile allocation for this terminal, always verifying that the number N of profiles has not been fully allocated or after a time out for example or because the contractual framework of the offer allows it. Such an embodiment then allows a dynamic generation of profiles. This dynamic profile allocation opens up the prospect of creating offers with billing linked to the actual number of profiles installed and used.

In addition, if the terminal TER is no longer under network coverage when sending its profile data, the SMDP+ server saves the data received from the control server OPE until the next time the terminal is connected to the SMDP+ server, since the controls have already been validated by the control server OPE. Thus, the terminal can later download the data from its profile by resuming the cycle from the step where the method stopped.

In the embodiment described above, the control server OPE can be integrated into the information system of the operator. However, it may be an independent control entity, or it may be associated with the SMDP+ server, for example. Indeed, more generally, verifying the activation code with a control server OPE (directly, based on the AC code received from the terminal) makes it possible to identify the operator to which the multi-SIM order is associated and to which offer this fleet order is attached. In addition, retrieving the terminal EID identifier makes it possible to determine the rights and the ICCID profile associated with this EID identifier.

Figure 3:
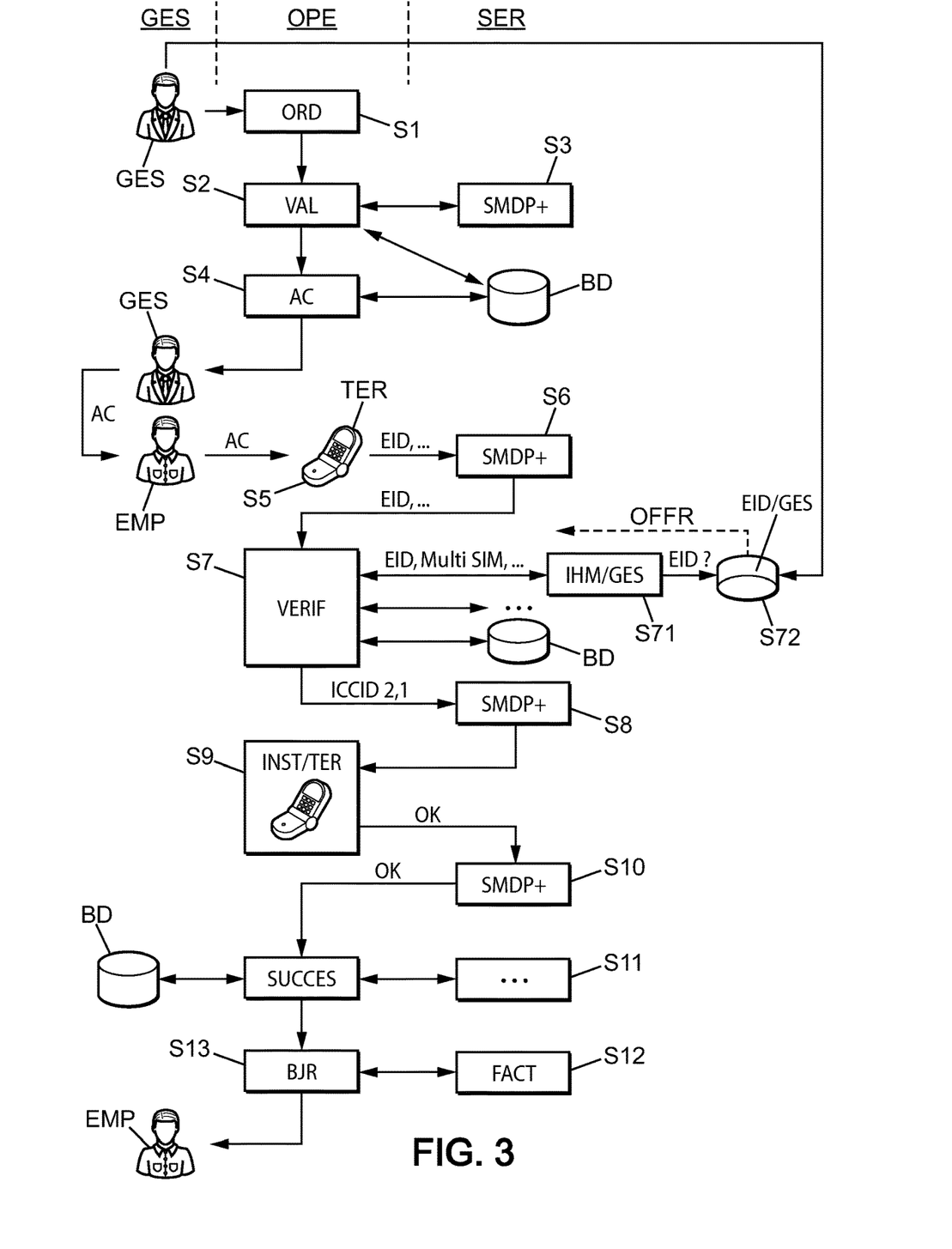
FIG. 3 illustrates an allocation of successive profiles to the N terminals, controlled step by step by the fleet manager, and FIG. 4 schematically illustrates the material structure of a control server.

In an embodiment illustrated in FIG. 3, it is possible to pre-determine profile subgroups (e. g. N1 gold profiles, N2 silver profiles, etc., with N1+N2+ . . . =N). Nevertheless, regardless of whether or not subgroups have been pre-defined, at any time in the interaction between the server OPE and the fleet manager, possibly via the information system of the operator proposing the offer, it is possible to question the fleet manager for a profile allocation decision. Furthermore, this interaction makes it possible to change the approach of the issuance of a profile by an operator and to decide this issuance from the information of the EID identifier. For example, this interaction can be used to test the compatibility of this EID identifier with a prospective ICCID identifier profile (technical eligibility) and, based on this test, to choose a profile compatible with the targeted terminal TER.

With reference to FIG. 3, we describe hereafter a use case where a fleet manager GES, administrator of the telecommunication memberships in a company, organizes the ordering of a fleet of terminals with different types of profiles to be allocated to each terminal in the fleet, each terminal being intended for use of an employee EMP in the company.

Steps S1 to S4 are similar to those described above with reference to FIG. 1, but in this embodiment, the following is provided:

N1 profiles of a first category ("gold" for example), to be allocated to N1 terminals in the fleet, N2 profiles of a second category ("silver" for example), to be allocated to N2 terminals in the fleet,

. . .

Ni profiles of category i to be allocated to Ni terminals, with N1+N2+ . . . +Ni=N (the total number of terminals in the fleet).

In particular, these profiles can be predefined by ICCID identifiers, with a first list of N1 ICCID1 identifiers for the first category, a second list of N2 ICCID2 identifiers for the second category, etc.

Then, the fleet manager GES can communicate the activation code to the employee EMP so that he or she enters it in his or her terminal in step S5. The SMDP+ server then transmits to the control server OPE, as previously with reference to FIG. 1, a MatchingID corresponding to the activation code AC, with the EID terminal. In step S7, the control server OPE finds the list of profiles corresponding to this activation code AC and contacts in step S71, for example via a man/machine interface of the information system of the operator, the fleet manager GES so that the manager can allocate a profile (among N1, or among N2, etc.) to this terminal. In an example of embodiment, the manager GES can have access to a memory storing a database of the EID identifiers of the fleet terminals, in correspondence with the names of the employees to whom the respective fleet terminals are allocated.

By recognizing the EID identifier received from the terminal of the employee EMP, the manager GES can determine the employee requesting a profile for his or her terminal and allocate a selected profile (for example, a profile from the second category of ICCID2.1 identifier). It will be understood that the fleet manager can manage a computer entity including:
- a memory to store the base of the EID identifiers in correspondence with the names (or identifiers) of future users of the terminals,
- a communication interface, in particular with the control server OPE, to retrieve the EID of the terminal requiring a profile,
- a processing circuit including, for example, a processor to identify the user requesting a profile from the EID of his or her terminal, and
- a man/machine interface to receive from the manager the choice of profile to be allocated.

Once the ICCID2.1 profile is determined and verified for this EID terminal in step S7, the other steps S8 and following are similar to those previously presented with reference to FIG. 1.

Figure 4:
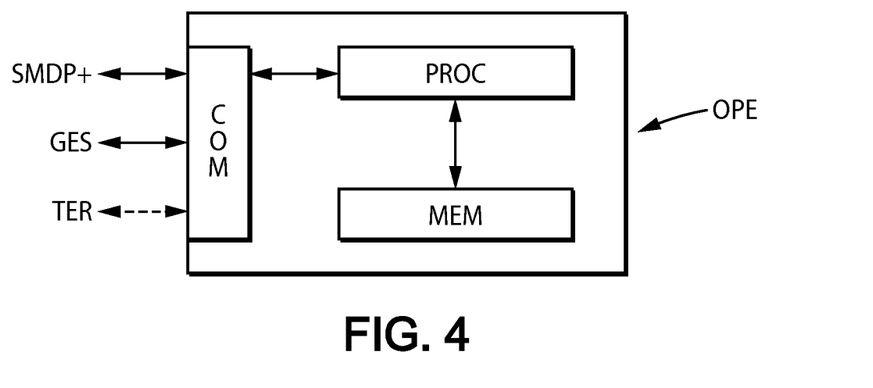

With reference now to FIG. 4, this invention also covers a control server for the implementation of the above method, and including in particular:
- a communication interface COM with the SMDP+ server, as well as with the fleet manager to receive the multi-SIM order, and/or to receive the types of profiles to be allocated as shown in FIG. 3, and with the terminal TER to communicate in step S13 the profile activation information on the terminal,
- a memory MEM unit storing instructions of a computer program in the sense of the invention, as well as working data, for example order data with a unique activation code AC, contact data of associated managers, profiles in predefined number and the associated ICCID identifiers, possibly the terminal EID identifiers in an embodiment, etc.
- a processing circuit comprising, for example, a processor PROC and cooperating with the working memory MEM, for carrying out the method described above.

Of course, the present invention is not limited to the embodiments described above as an example; it extends to other variants.

For example, we have described above in particular an SMDP+-type access server and referenced more generally SER on the figures. However, other evolving technologies are possible.

In addition, as previously indicated, the activation code AC is initially saved in the memory of the control server in correspondence with the N profiles to be allocated to the N terminals in the fleet. This correspondence, in practice, can be between the code AC (determined by the MatchingID received from the terminal, on the one hand, and the EID identifiers of terminal (or their SIM) and/or profile ICCID identifiers (not yet defined), on the other hand.

Although the present disclosure has been described with reference to one or more examples, workers skilled in the art will recognize that changes may be made in form and detail without departing from the scope of the disclosure and/or the appended claims.

The invention claimed is:

1. A method, implemented by a control server, for configuring a security module associated with a telecommunication terminal, comprising:
   allocating a unique activation code corresponding to a subscription comprising a plurality of N profiles to be allocated to a set of N respective terminals, N being an integer greater than one, wherein the allocating comprises the following acts:
   a) after activation of the code with a first terminal, allocating a profile to the first terminal and recording the profile allocation to the first terminal; and
   b) for a new profile allocation request corresponding to said activation code, repeating act a) if the N profiles have not already been allocated.

2. The method according to claim 1, wherein the control server associates N profiles to be allocated during the activation code allocation.

3. The method according to claim 1, wherein the control server associates a profile with the terminal during the allocation request.

4. The method according to claim 1, wherein any new profile request corresponding to said activation code is rejected if the N profiles have already been allocated.

5. The method according to claim 1, wherein after the activation of the code in a terminal from the terminal set, the control server:
   receives from that terminal at least one security module identifier associated with the terminal, and
   verifies whether a profile has already been allocated for a terminal having said security module identifier.

6. The method according to claim 5, wherein, if a profile has already been allocated for a terminal having said security module identifier, then the control server rejects a profile allocation request sent by a terminal having said security module identifier.

7. The method according to claim 5, wherein, if no profile has already been allocated for a terminal having said security module identifier, the control server communicates with a computer entity having a man/machine interface available to a manager of the terminal set, in order to receive from the manager a choice of profile to be allocated to said terminal.

8. The method according to claim 1, wherein, after the activation of the code in a terminal from the set of terminals, the control server receives from this terminal at least one data corresponding to the activation code and allowing the control server to find the profile allocations that have already been made for terminals from the set of terminals.

9. The method according to claim 1, wherein terminal data received by the control server, prior to the allocation of a profile to this terminal, pass through an access server.

10. The method according to claim 1, wherein data for installing a profile at a terminal are sent by the control server and transmitted to the terminal via an access server.

11. A non-transitory computer-readable medium comprising a computer program stored thereon, comprising software instructions for implementing a method for configuring a security module associated with a telecommunication terminal, when this program is executed by a processor of a control server, wherein the program configures the control server to allocate a unique activation code corresponding to a subscription comprising a plurality of N profiles to be allocated to a set of N respective terminals, N being an integer greater than one, wherein the allocating comprises the following acts:
   a) after activation of the code with a first terminal, allocating a profile to the first terminal and recording the profile allocation to the first terminal; and b) for a new profile allocation request corresponding to said activation code, repeating act a) if the N profiles have not already been allocated.

12. A control server, comprising:

at least one processing circuit arranged to configure a security module embedded in a telecommunication terminal from a set of N terminals, wherein configuring comprises allocating a unique activation code corresponding to a subscription comprising a plurality of N profiles to be allocated to a set of N respective terminals, wherein N is an integer greater than one and the allocating comprises:

a) after activation of the code with a first terminal, allocating a profile to the first terminal and recording the profile allocation to the first terminal; and b) for a new profile allocation request corresponding to said activation code, repeating act a) if the N profiles have not already been allocated.

13. The server according to claim 12, further comprising a communication interface with an access server.

14. The server according to claim 12, including a communication interface with a computer entity including a man/machine interface available to a manager of the set of terminals, in order to receive from the manager a choice of profile to be allocated to each terminal from the set of terminals.

* * * * *